(12) United States Patent
Teterud

(10) Patent No.: US 6,366,421 B2
(45) Date of Patent: *Apr. 2, 2002

(54) ADJUSTABLE WRITER OVERSHOOT FOR A HARD DISK DRIVE WRITE HEAD

(75) Inventor: Patrick M. Teterud, Plano, TX (US)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/213,560

(22) Filed: Dec. 17, 1998

(51) Int. Cl.[7] .................................. G11B 5/02
(52) U.S. Cl. .......................... 360/68; 360/46
(58) Field of Search .............. 360/67, 68, 46; 327/423, 424, 110, 588, 553, 554

(56) References Cited

U.S. PATENT DOCUMENTS

| | | | | |
|---|---|---|---|---|
| 5,534,819 A | * | 7/1996 | Gunter et al. | 327/553 |
| 5,946,236 A | * | 8/1999 | Kajitani | 365/185.19 |
| 6,052,017 A | * | 4/2000 | Pidutti et al. | 327/424 |

* cited by examiner

Primary Examiner—Regina Y. Neal
(74) Attorney, Agent, or Firm—Frederick J. Telecky, Jr.; Bret J. Petersen

(57) ABSTRACT

An improved write drive circuit which provides an adjustable writer drive current and overshoot transient for a H-bridge drive circuit in a hard disk drive. The invention uses a variable capacitor circuit to give an initial boost to the write driver transistors. In a preferred embodiment, the capacitance of the variable capacitor is controlled by a word written to the disk drive pre-amp over the serial control port.

16 Claims, 3 Drawing Sheets

ADJUSTABLE WRITER OVERSHOOT FOR A HARD DISK DRIVE WRITE HEAD

FIELD OF THE INVENTION

The present invention relates to the write driver circuit for a hard disk drive (HDD). More particularly, it relates to a hard disk drive write head and circuits for adjusting the overshoot of the write head drive current to optimize the rise time and fall time and other characteristics of the write to disk operation.

BACKGROUND OF THE INVENTION

A hard disk drive storage system typically includes one or more rotating disks, or platters having magnitizible material coated on their surfaces. Read/write heads associated with each platter surface move together radially across the head to reach addressable data regions located on concentric circles called tracks. It is now common to have separate read and write heads. The write head is essentially a small coil of wire which stores data by magnetizing small regions of the disk platter along the tracks. A current driven through the write head creates a temporary magnetic field which magnetizes a small region of the disk at the current position of the write head.

The electronic circuitry used to drive current through the write head typically uses an H-bridge as shown in FIG. 1. For example, U.S. Pat. No. 6,638,012, issued to Hashimoto et al. and incorporated herein by reference, uses an H-bridge for a write driver circuit. The purpose of the H-bridge is to allow electric current to be driven through the write head in either direction. When the current is driven in one direction a magnetic field is created with the north pole in one direction, and when the current is driven in the opposite direction, a magnetic field is created with the north pole in the opposite direction. The H-bridge operates to switch the drive current through the head by turning on a pair of transistors to allow current to flow in a path from a supply source to ground. For example, current flows through the write head from Hx to Hy when transistors Y are turned on and transistors $\overline{Y}$ are turned off. Similarly, current flows the opposite direction when transistors $\overline{Y}$ are turned on and transistors Y are turned off. The tr, tf (rise time, fall time) is the time corresponding to the speed at which current can reverse through the inductive load of the HDD write head.

It is desirable to increase the speed of the change of current flow to increase the amount of data that can be stored on a single track of the HDD platter. A limitation to decreasing the tr, tf is the amount of overshoot. FIG. 2 illustrates the current waveform for a test input to a typical prior HDD write head. As the switching speed of the current through the head in increased, an overshoot 20 is produced at the head. While some overshoot can be tolerated, too much overshoot in some applications can have deleterious effects on the head and consequently the overall drive system performance.

The prior art circuit provided enhanced overshoot by adding capacitors 16, 18 as shown in FIG. 1. In this circuit, at the beginning of the drive cycle, additional current is dumped to the write head nodes through the capacitors 16, 18.

SUMMARY OF THE INVENTION

The present invention provides an improved write drive circuit which allows the adjustable control of the overshoot transients of an H-bridge head drive circuit. In one embodiment, the invention provides an adjustable capacitor in the head driver circuits to selectably determine the current injected to the head drive during the switching transient period. The variable capacitor may be controlled through the serial input to the pre-amp device to allow programmability of the overshoot characteristics for the hard disk drive.

In another embodiment of the present invention, an adjustable overshoot circuit includes a variable capacitor having several capacitors arranged in parallel and selectably connected to the circuit with the final metalization layers of the integrated circuit.

In yet another embodiment, there is provided an adjustable current inverter in conjunction with a fixed capacitor to drive the H-bridge transistors. The adjustable current inverter may comprise several transistors with individual control inputs. These controlled transistors can be used to select one or more transistors to drive the H-bridge transistors through a capacitor.

An advantage of the present invention is the manufacturer of the HDD can optimize the performance of the head by using the selectable nature of the current overshoot. Optimization could be done for a particular disk drive design, for a specific drive during burn-in, or "on the fly" when the head is accessing different tracks or sections of the disk platter.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION OF THE PREFERRED EMBODIMENTS

Figure 1:
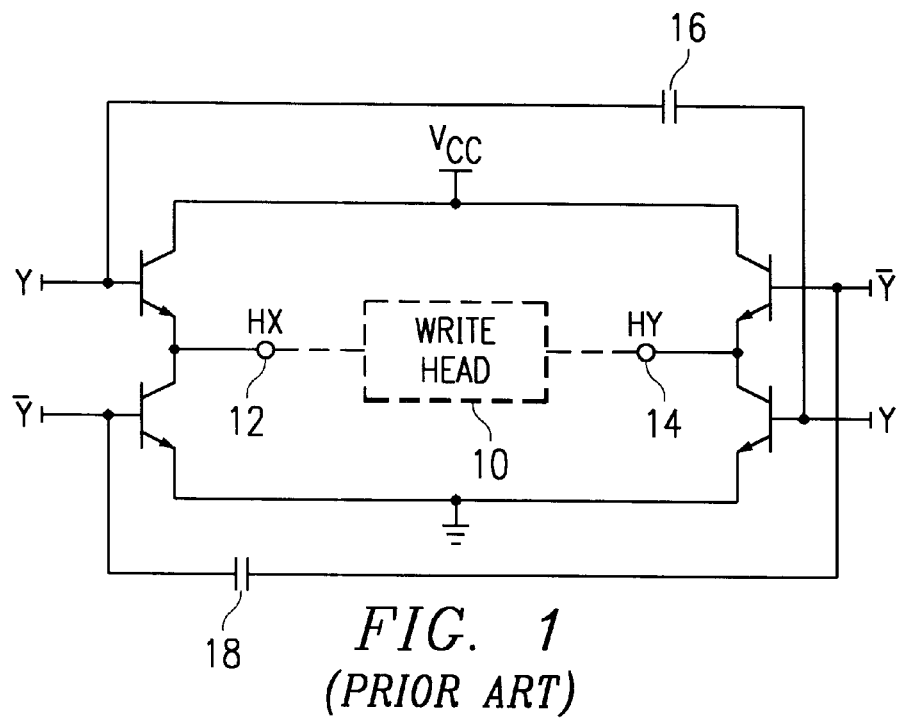
FIG. 1 Represents an H-bridge driver circuit according to the prior art.

As discussed above, the electronic circuitry used to drive current through a HDD write head typically uses an H-bridge as shown in the prior art circuit of FIG. 1. This figure represents a simplified circuit of the write driver, sometimes referred to as the "writer" circuit. Typically the write driver circuit includes additional circuitry for driving the Y and $\overline{Y}$ inputs, with the top two or bottom two transistors setting the current value. See for example, U.S. Pat. No. 6,638,012 referenced above. The purpose of the H-bridge is to allow electric current to be driven through the write head in either direction. When the current is driven in one direction a magnetic field is created with the north pole in one direction, and when the current is driven in the opposite direction, a magnetic field is created with the north pole in the opposite direction. The magnetic field is then used to "write" data to the disk platter by magnetizing a small region on the disk platter.

The H-bridge operates to switch the drive current through the head by turning on a pair of transistors to allow current to flow in a path from a supply source to ground. For example, current flows through the write head from Hx to Hy when transistors Y are turned on and transistors $\overline{Y}$ are turned off. Similarly, current flows in the opposite direction when transistors $\overline{Y}$ are turned on and transistors Y are turned off. The DC operating point of the write head is the voltage at either side of the head when the steady-state current is flowing through the head.

Figure 2:
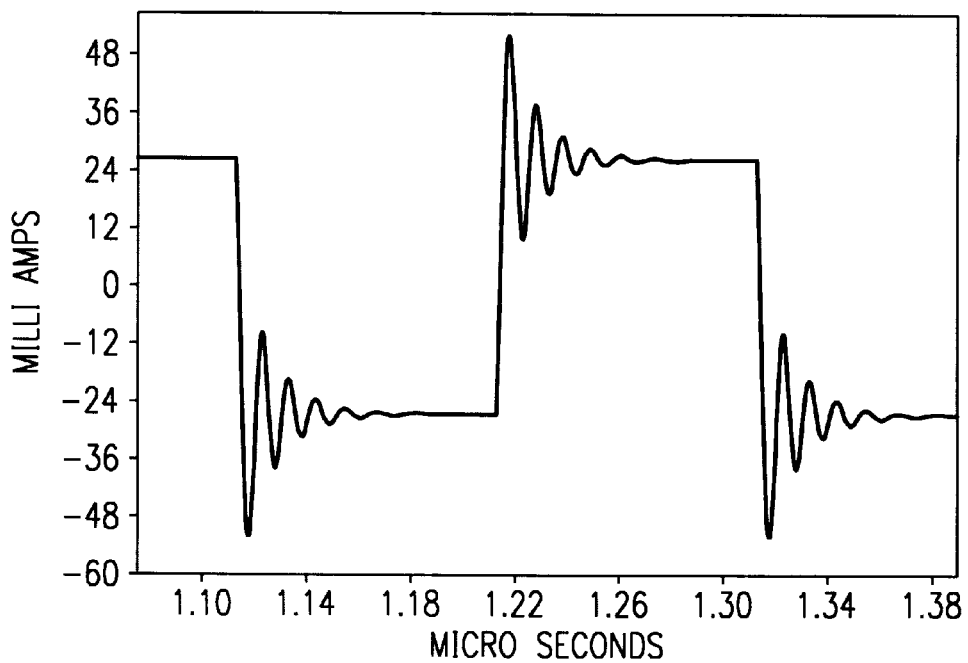
FIG. 2 Shows the response to a test pulse applied to the H-bridge driver circuit of FIG. 1 according to the prior art.

Since the HDD write head is an inductive load, there are voltage and current swings (a characteristic transient ring) at the Hx and Hy outputs when the current through the head is reversed rapidly as shown in FIG. 2. It is desirable to increase the write frequency of the write head current transition tr/tf in a controllable way to selectably optimize the overall disk drive performance, such as during manufacture.

Figure 3:
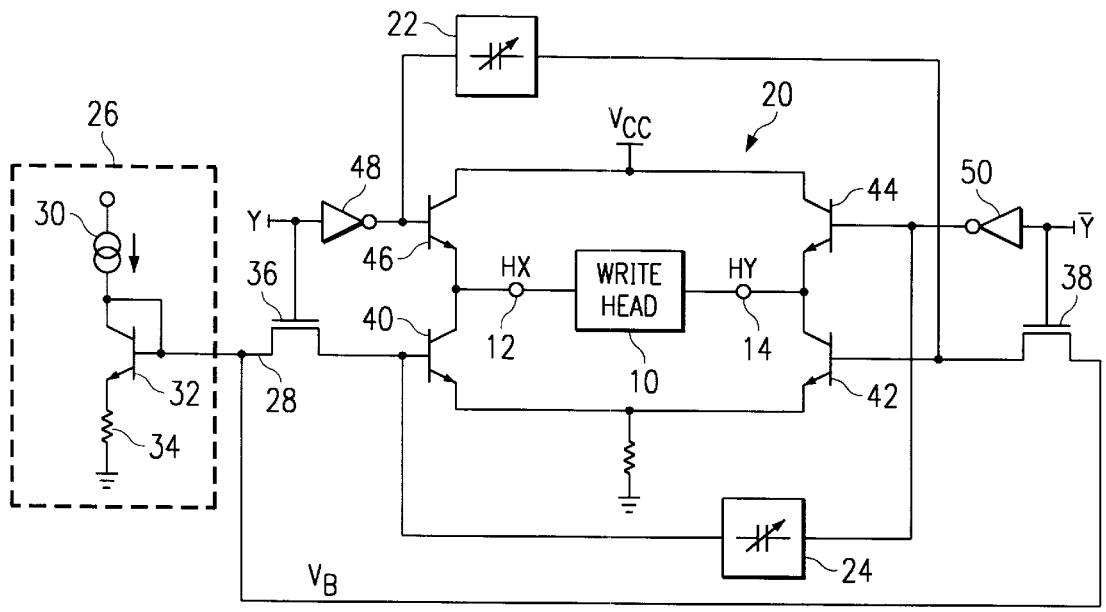
FIG. 3 Shows an adjustable ring circuit for a write driver according to an embodiment of the present invention.

An embodiment of the present invention is illustrated in FIG. 3. The circuit includes the H-drive circuit 20 described above in addition to circuitry for establishing a bias voltage and the adjustable overshoot circuit. The adjustable overshoot circuit includes a variable capacitor 20, 24 connected between the upper and lower drive transistors of the write head. The adjustable overshoot circuit provides an adjustable initial current to drive the write head and thereby adjustably control the overshoot.

Again referring to FIG. 3, a voltage bias circuit 26 provides a voltage $V_b$ at node 28. The voltage bias circuit 26 may consist of a current source 30 connected to the gate and collector of a transistor 32, and the emitter of the transistor connected to ground through a resistor 34 as shown. In the illustrated embodiment, the bias voltage $V_b$ is connected to the source input of two MOS transistors 36, 38. The drains of the two MOS transistors 36, 38 are connected to the gates of the lower H-Bridge transistors 40, 42. The gates of these transistors are connected to drive signals Y and $\overline{Y}$. Thus, transistors 36, 38 switch voltage bias current $V_b$ to the gates of the lower H-Bridge transistors 40, 42 as controlled by the drive signals Y and $\overline{Y}$. The voltage of $V_b$ is chosen to provide the desired steady-state head current.

As described above, the operation of the circuit of FIG. 3 achieves an alternating drive current through write head 10 controlled by the write control signal Y and $\overline{Y}$. As an example of the circuit operation, the transition of Y from high to low will be described which causes current to flow through transistor 46 and transistor 42. At the transition of Y from high to low, transistor 36 is turned off and transistor 38 is turned on to remove the bias voltage from transistor 40 and apply it to transistor 42. Likewise, the transition of Y through inverter 48 turns transistor 46 on. And $\overline{Y}$, which simultaneously transitions from low to high as Y transitions from high to low, is applied to inverter 50 to turn transistor 44 off. As the output of inverter 48 transitions from low to high, variable capacitor 22 provides an initially low impedance path for current to flow to the gate of transistor 42. Therefore, capacitor 22 provides an initial drive current to transistor 42 to turn transistor 42 on faster. This initial drive to transistor 42 provides a faster tr/tf and a corresponding overshoot. Since variable capacitor 42 becomes charged it does not provide further steady state current to drive transistor 42. The steady state current through the head is determined by $V_b$ applied to the gate of transistor 42. The transition of Y from low to high provides the current to flow in the opposite direction through the write head in the similar manner as described above.

Figure 4:
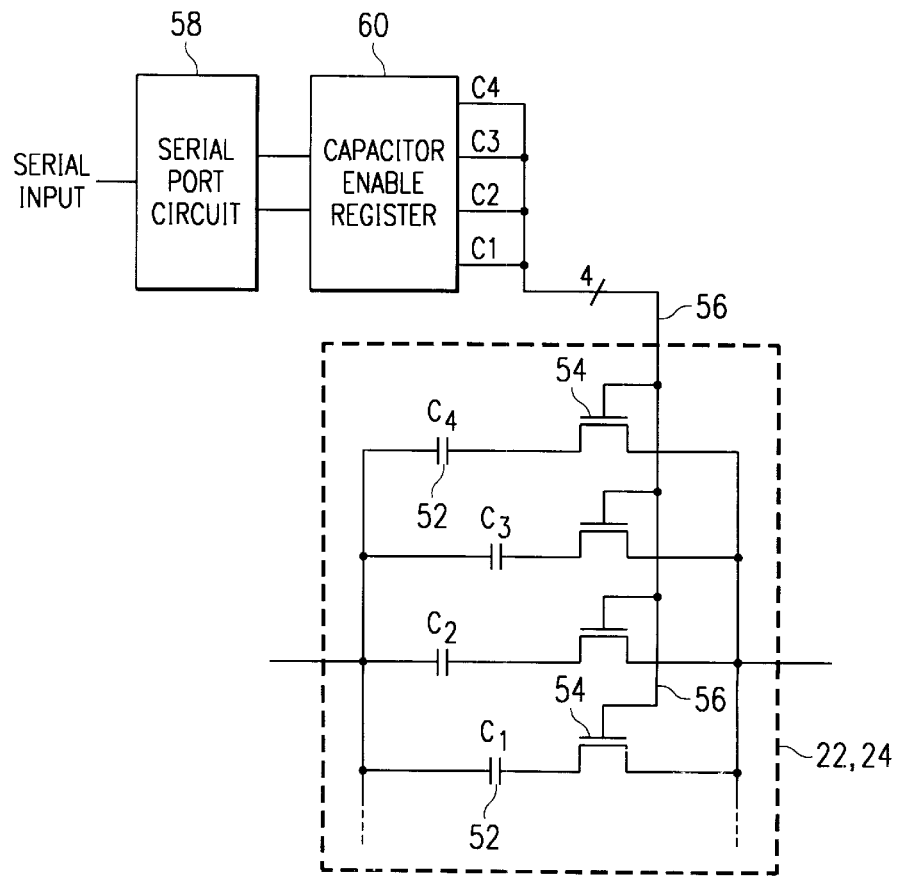
FIG. 4 Shows an adjustable capacitor circuit for an embodiment of the present invention.

FIG. 4 represents another embodiment of the present invention. In this embodiment, the generic variable capacitor shown in FIG. 3 is replaced with a variable capacitor 22, 24 as shown in FIG. 4. Variable capacitor 22, 24 includes one or more capacitors 52 (C1 through C4) connected in parallel. Each of the capacitors 52 is connected on one or both terminals to a transistor 54. The transistor 54 has a control line 56 connected to the transistor gate to turn the transistor 54 on. When the transistor is turned on, the capacitance of the capacitor associated with that transistor is added to the circuit of FIG. 3.

Control of variable capacitor 22, 24 may be accomplished as shown in FIG. 4. A serial input to the integrated circuit, typically the "pre-amp" chip, may be processed by a serial port circuit 58 according to prior art serial input protocols. Serial port circuit 58 then loads enable information into a capacitor enable register 60. Capacitor enable register 60 contains a one bit register for each possible capacitor in the variable capacitor. The outputs of capacitor enable register 60 drive the gates of transistors in the variable capacitors. Thus, the variable capacitor can be adjusted through the serial port by turning on the appropriate transistors to add the individual capacitances to the desired total capacitance.

Figure 5:
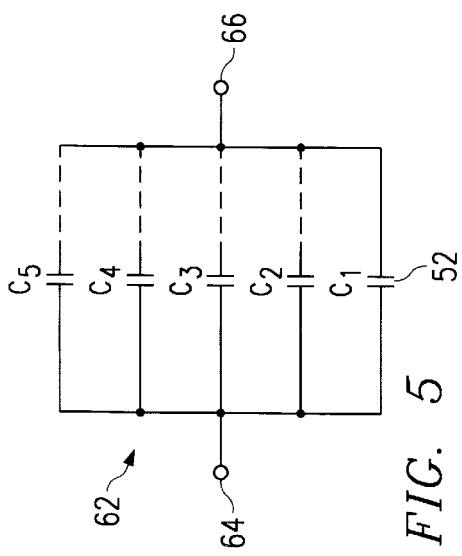
FIG. 5 Shows an adjustable capacitor circuit for an embodiment of the present invention.

FIG. 5 represents yet another embodiment of the present invention. In this embodiment, the generic variable capacitor shown in FIG. 3 is replaced with a variable capacitor 62 such as shown in FIG. 5. Variable capacitor 62 includes one or more capacitors 52 (C1 through C5) connected in parallel. Each of the capacitors 52 is connected on one terminal to a common terminal 64. The second terminal of each capacitor 52 may or may not be connected to terminal 66. The connections of the second terminal are determined by a final metalization step during the chip manufacturing process. Thus, the integrated circuit can be modified for the specific response desired by changing the metalization step of processing but without changing the underlying circuit design.

Figure 6:
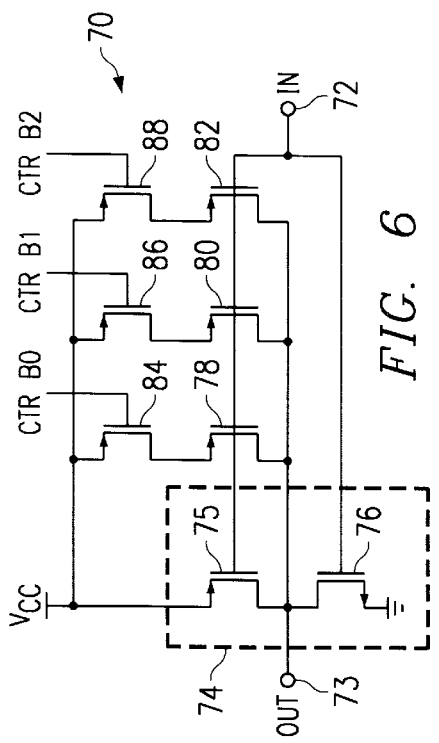
FIG. 6 Shows an adjustable current inverter for an embodiment of the present invention.

FIG. 6 shows another embodiment of the present invention. This embodiment includes an adjustable current inverter 70 in conjunction with a capacitor to drive the H-bridge transistors. This embodiment could use the same overall circuit as shown in FIG. 3 with the exception that the inverters 48, 50 are replaced with an adjustable current inverter such as shown in FIG. 6. In a preferred embodiment having an adjustable drive inverter, a fixed capacitor instead of the adjustable capacitor 22, 24 is preferably used.

The adjustable current inverter 70 includes an input 72 and an output 73. The illustrated adjustable current inverter includes a basic inverter 74 having a PMOS 75 and NMOS 76 transistor pair connected between reference voltages VCC and GND. Additional PMOS transistors 78, 80, 82 allow additional current to be supplied to output 76. When a corresponding control transistor 84, 86, 88 is enabled by control inputs CTRB0, CTRB1 and CTRB3 respectively, and input 74 is active, each of the enabled PMOS transistors supply additional current to output 73 from voltage source VCC. The control inputs may be driven by an enable register through a serial port circuit as shown in FIG. 4. As would be apparent to those skilled in the art, any number of additional PMOS transistors with control inputs may be used for additional levels of controlled overshoot.

When used in conjunction with the circuit of FIG. 3, the variable current inverter 70 drives capacitor 24 with a variable current capability. Preferably, PMOS transistor 75 is chosen of sufficiently small current capacity in conjunction with capacitor 48, 50 that minimum overshoot will occur when the control lines are disabled, and a maximum overshoot will occur when each of the control lines are enabled. Further, transistors 78, 80, 82 may be of increasing current drive, such as a ratio of 1:2:4, in order to allow stepwise increments to the inverter drive current.

Figure 7:
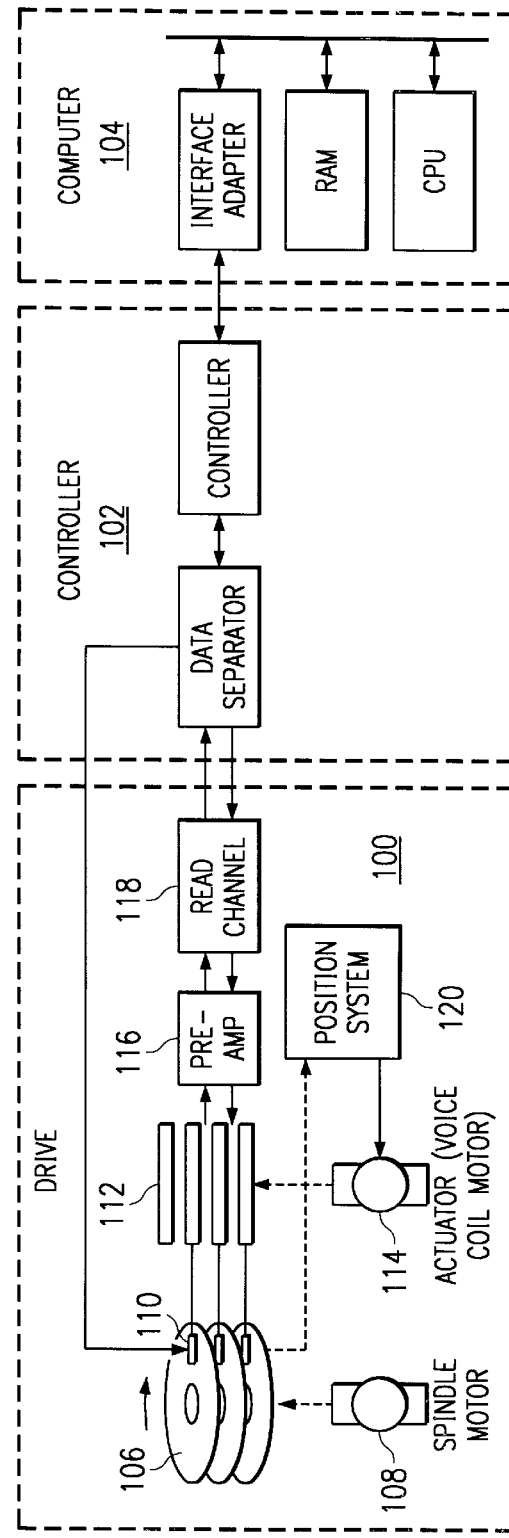
FIG. 7 Represents a HDD system level view o f an embodiment of the present invention.

FIG. 7 represents a HDD system level view of the present invention. The hard disk drive 100 is connected to a computer 102 through a controller 104. The hard disk drive 100 has disk platters 106, which are driven by motor 108 to rotate as shown. Read and write heads 110 move upon an actuator mechanism 112 driven by a voice coil motor 114. Data detected by the heads is passed through the preamp 116 and then a read channel 118 and also used to provide feedback to the head actuator position system 120. Data signals from the HDD are fed to the controller 102 which is then passed to the computer 104. The present invention concerns improvements to the drive circuitry to write heads 110 as discussed above.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments. For example, while npn transistors are shown as a preferred embodiment, other transistor types such as nmos transistors are also contemplated by the current invention. Also, the variable current inverter could be modified to supply a variable sink current instead of a supply current.

What is claimed is:

1. A hard disk drive for a computer system comprising:
   a. one or more platters having magnetic media on one or more surfaces;
   b. a write head associated with at least one of said surfaces having magnetic media;
   c. an H-bridge circuit capable of driving a current through said write head, said H-bridge circuit comprising two upper transistors and two lower transistors; and
   d. a circuit to supply an adjustable initial drive current to drive said H-bridge circuit;
   e. wherein said adjustable initial drive current circuit comprises an adjustable capacitor circuit directly connected without intervening component delays between the gate of said lower transistors and the logic signal which drives said upper transistors on the opposite side of said H-bridge such that the upper and lower transistor pairs turn on at the same time.

2. The hard disk drive of claim 1 wherein said adjustable initial drive current circuit is directly connected between the gate of said lower transistors and the gate of said upper transistors on the opposite side of said H-bridge.

3. The hard disk drive of claim 2 wherein said variable capacitor is at least one of a block of capacitors having connections to said transistor gates and the remainder of said block of capacitors have no connections, since the connections were not made during a final metalization step during manufacture of the circuit.

4. The hard disk drive of claim 3 wherein said variable capacitor is a plurality of capacitors having programmable connections to said transistor gates.

5. The hard disk drive of claim 4 wherein said programmable connections to said transistor gates includes an array of capacitors with at least one terminal connected to a transistor and the gate of said transistor enabled by an enable register for programmable control of the connections of said array of capacitors.

6. A hard disk drive for a computer system comprising:
   a. one or more platters having magnetic media on one or more surfaces;
   b. a write head associated with at least one of said surfaces having magnetic media;
   c. an H-bridge circuit capable of driving a current through said write head, said H-bridge circuit comprising two upper transistors and two lower transistors; and
   d. an adjustable initial drive current circuit comprising an adjustable inverter circuit and a capacitor, wherein the adjustable inverter is connected to the capacitor to provide an initial drive current to the H-bridge lower transistors through the capacitor.

7. The hard disk drive of claim 6 wherein said adjustable inverter circuit comprises an N-mos and PMOS pair followed by one or more additional PMOS transistors connected to a reference voltage through an enable transistor, and wherein said NMOS and PMOS pair is capable of supplying a current to said H-bridge of a limited amount in combination with said capacitor, and wherein said additional PMOS transistors are also capable of providing an additional current to said capacitor when said additional PMOS transistors have their corresponding enable transistors turned on.

8. The hard disk drive of claim 7 wherein said additional PMOS transistors are of stepwise increasing current capacity.

9. An integrated circuit for driving a write head of a hard disk drive comprising:
   a. an H-bridge circuit capable of driving a current through said write head, said H-bridge circuit comprising two upper transistors and two lower transistors; and
   b. a circuit to supply an adjustable initial drive current to drive said H-bridge circuit
   c. wherein said adjustable initial drive current circuit comprises an adjustable capacitor circuit directly connected without intervening component delays between the gate of said lower transistors and the logic signal which drives said upper transistors on the opposite side of said H-bridge such that the upper and lower transistor pairs turn on at the same time.

10. The integrated circuit of claim 9 wherein said adjustable initial drive current circuit is directly connected between the gate of said lower transistors and the gate of said upper transistors on the opposite side of said H-bridge.

11. The integrated circuit of claim 9 wherein said variable capacitor is at least one of a block of capacitors having connections to said transistor gates and the remainder of said block of capacitors have no connections, since the connections were not made during a final metalization step during manufacture of the circuit.

12. The integrated circuit of claim 9 wherein said variable capacitor is a plurality of capacitors having programmable connections to said transistor gates.

13. The integrated circuit of claim 12 wherein said programmable connections to said transistor gates includes an array of capacitors with at least one terminal connected to a transistor and the gate of said transistor enabled by an enable register for programmable control of the connections of said array of capacitors.

14. An integrated circuit for driving a write head of a hard disk drive comprising:
   a. an H-bridge circuit capable of driving a current through said write head, said H-bridge circuit comprising two upper transistors and two lower transistors; and b. an adjustable initial drive current circuit comprising an adjustable inverter circuit and a capacitor, wherein the adjustable inverter is connected to the capacitor to provide an initial drive current to an H-bridge lower transistor through the capacitor.

15. The integrated circuit of claim 14 wherein said adjustable inverter circuit comprises an N-mos and PMOS pair followed by one or more additional PMOS transistors connected to a reference voltage through an enable transistor, and wherein said NMOS and PMOS pair is capable of supplying a current to said H-bridge of a limited amount in combination with said capacitor, and wherein said additional PMOS transistors are also capable of providing an additional current to said capacitor when said additional PMOS transistors have their corresponding enable transistors turned on.

16. The hard disk drive of claim 15 wherein said additional PMOS transistors are of increasing current capacity.

* * * * *